United States Patent [19]

Veenstra

[11] Patent Number: 5,517,186

[45] Date of Patent: May 14, 1996

[54] EPROM-BASED CROSSBAR SWITCH WITH ZERO STANDBY POWER

[75] Inventor: Kerry Veenstra, San Jose, Calif.

[73] Assignee: Altera Corporation, San Jose, Calif.

[21] Appl. No.: 159,189

[22] Filed: Nov. 30, 1993

Related U.S. Application Data

[63] Continuation of Ser. No. 813,802, Dec. 26, 1991, abandoned.

[51] Int. Cl.[6] .................................................. H04Q 9/00
[52] U.S. Cl. ........................ 340/825.83; 340/825.91; 340/825.93; 326/39; 326/41; 326/44
[58] Field of Search ..................... 340/825.79, 825.83, 340/825.85–825.91, 825.93; 326/39, 41, 44

[56] References Cited

U.S. PATENT DOCUMENTS

| | | | |
|---|---|---|---|
| 4,317,110 | 2/1982 | Hsu | 340/825.91 |
| 4,433,331 | 2/1984 | Kollaritsch | 340/825.83 |
| 4,443,773 | 4/1984 | Rall et al. | 340/825.93 |
| 4,779,010 | 10/1988 | Moss | 307/469 |
| 4,853,562 | 8/1989 | Yamada | 307/468 |
| 4,871,930 | 10/1989 | Wong et al. | 307/465 |
| 4,897,645 | 1/1990 | Hofmann | 307/468 |
| 4,899,070 | 2/1990 | Ou et al. | 307/530 |
| 4,920,515 | 4/1990 | Obata | 340/825.91 |
| 5,128,565 | 7/1992 | McClintock et al. | 307/443 |
| 5,220,533 | 6/1993 | Turner | 365/218 |

FOREIGN PATENT DOCUMENTS

| | | |
|---|---|---|
| 0206102 | 12/1986 | European Pat. Off. . |
| 0345623 | 12/1989 | European Pat. Off. . |

OTHER PUBLICATIONS

Cross–Point Array with Non–Volatile FET Devices, IBM Technical Disclosure Bulletin, vol. 27, No. 10A, Mar., 1985, p. 5894.

Primary Examiner—Glen Swann
Assistant Examiner—Andrew Hill
Attorney, Agent, or Firm—Fish & Neave; Robert R. Jackson; G. Victor Treys

[57] ABSTRACT

An EPROM-based crossbar switch is disclosed that provides for the programmable interconnection of logic circuitry. Circuit layout and design features reduce circuit real estate and bitline parasitic capacitances, allowing a high level of integration and faster switching speeds.

13 Claims, 2 Drawing Sheets

EPROM-BASED CROSSBAR SWITCH WITH ZERO STANDBY POWER

CROSS REFERENCE TO RELATED APPLICATION

This application is a continuation of commonly-assigned U.S. patent application Ser. No. 07/813,802, filed Dec. 26, 1991, abandoned.

BACKGROUND OF THE INVENTION

This invention relates to the programmable interconnection of digital circuits. Particularly, the invention relates to programmable interconnections known as crossbar switches, which are used to switch N digital inputs into N digital outputs.

Various interconnection schemes are possible, for example, as described in Wong et al. U.S. Pat. No. 4,871,930, blocks of programmable logic or logic array blocks (LABs) may be programmably interconnected using programmable interconnect arrays (PIAs). In this manner, relatively many small logic elements may be efficiently interconnected using a hierarchical method—first, interconnecting primitive logic elements into LABs, and second, interconnecting LABs using PIAs. The PIAs accept all logic function outputs from the LABs, and provide the means to programmably interconnect a small subset of these back into the LABs.

However, it is often desirable to provide digital circuit interconnections that programmably switch a number of inputs into an equal number of outputs. Further, it is desirable that the switching circuit have low standby power and display relatively small parasitic capacitance values. The switch should also be simple to program and low in cost.

SUMMARY OF THE INVENTION

In view of the foregoing, it is an object of this invention to provide a programmable crossbar switch with low standby power consumption.

It is a further object of the invention to provide a crossbar switch that is based on erasable programmable read only memory (EPROM) transistors, and thus is relatively inexpensive and readily programmed.

It is a further object of this invention to provide an EPROM-based crossbar switch with low bitline parasitic capacitance.

The present invention provides the desired structure set out above. Namely, a crossbar switch is provided for programmably interconnecting N input nodes to N output nodes, allowing the interconnection of digital circuits, while adding relatively little parasitic capacitance to the overall circuit. Contributing to the low parasitic capacitance is the use of only two EPROM transistors for each intersection of two bitlines and two wordlines. As shown in commonly assigned, co-pending U.S. patent application Ser. No. 596,764, concerning sense amplifiers with complementary bitlines, prior art intersections typically have four EPROM transistors, resulting in greater bitline loading and slower circuit performance.

DETAILED DESCRIPTION OF THE PREFERRED EMBODIMENTS

Figure 1:
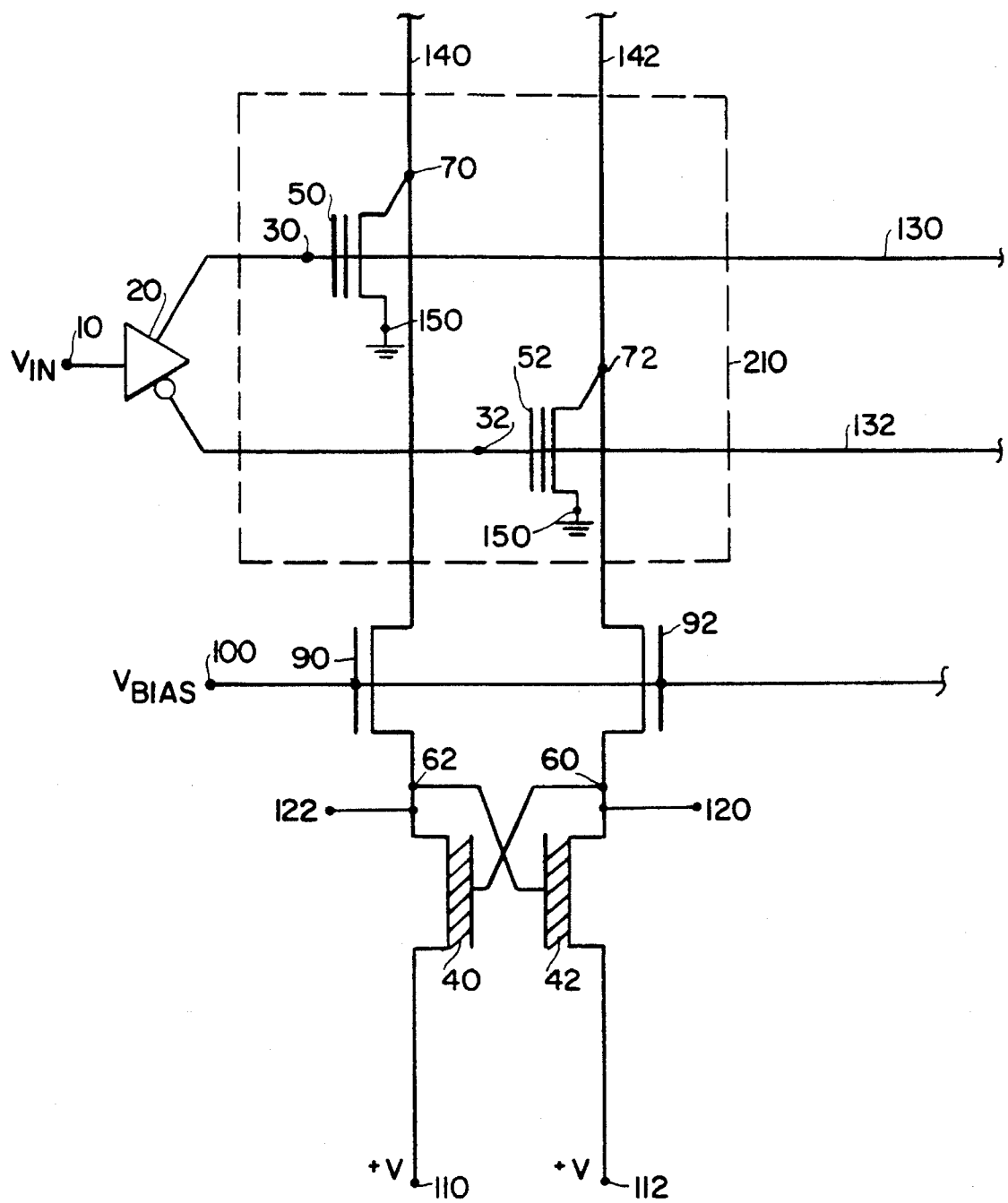
FIG. 1 is a schematic drawing of the circuit of one cell of an illustrative embodiment of the crossbar switch of this invention. Also shown are bias transistors and the pair of cross-coupled inverters this cell drives.

As shown in FIG. 1, a representative portion of a crossbar switch constructed in accordance with this invention includes complementary wordlines 130 and 132 intersecting complementary bitlines 140 and 142 via programmable EPROM transistors 50 and 52 (each having a floating gate, as shown, which allows transistors 50 and 52 to be field-programmable). In an N×N crossbar switch there will be $N^2$ such intersections, laid out as shown in part in FIG. 2. This allows one of N inputs to be programmably switched to any one of N outputs by the appropriate programming by applying charge to the floating gates in the conventional manner) of the EPROM transistors. Specifically, if EPROM transistors 50 and 52 are programmed, y applying charge to the transistors' floating gates, they will not switch and the state of the input voltage, $V_{IN}$, at node 10 will not affect the output voltage, $V_{OUT}$, at node 120. However, if EPROM transistors 50 and 52 are erased (not programmed), the transistors will switch in response to changes in $V_{IN}$. By programming all but one pair of EPROM transistors on a pair of complementary wordlines, an input signal at an input node, such as node 10, will be output at the appropriate output node, such as 120. Various EPROM transistors may be employed. For example, EPROM transistors 50 and 52 may be UV-erasable EPROM transistors or electrically erasable programmable read only memory ($E^2$PROM) transistors.

Referring to FIG. 1, the propagation of an input signal at node 10 via erased EPROM transistors 50 and 52 to output node 120 is described as follows, for both low to high and high to low transitions. Note the power supply voltage at nodes 110 and 112 is approximately 5.0 V, the bias voltage at node 100 is in the range of 3.0 V, and the potential of the ground nodes 150 is maintained in the range of 0 V. The bias transistor arrangement prevents nodes 70 and 72 from rising so high as to falsely program EPROM transistor 50 or 52.

For a low to high transition, the initial state of node 10 is low. Input buffer 20 therefore provides a logical low signal at an output connected to node 30 and the inverse—a logical high signal—at an inverting output connected to node 32. Thus, EPROM transistor 50 is initially off, and node 70 high. The high signal of node 70 is communicated via n-type buffer transistor 90 to node 62, holding p-type transistor 42 off. The complement of the low node 10 voltage at node 52 holds EPROM transistor 32 on, holding node 72 low. As p-type transistor 42 is off, only a negligible current flows in bit line 142. The low signal at node 72 is communicated via buffer transistor 92 to node 60 where it holds p-type transistor 40 on. However, as EPROM transistor 50 is off, a negligible current flows in bit line 140. With no current flowing in bit lines 140 and 142, the standby power consumption of the circuit in FIG. 1 is near zero. Note the low signal at node 72 is communicated to output node 120 via buffer transistor 92.

A low to high transition at input node 10 causes EPROM transistor 50 to turn on, pulling node 70 low. This low voltage is transmitted to node 62 via buffer transistor 90, turning on p-type transistor 42. Low node 32, which is the complement of high node 10, has turned off EPROM transistor 52. Thus, the turn-on of p-type transistor 42 brings node 60, and therefore output node 120, high. Subsequently, p-type transistor 40 is turned off, blocking current flow in bit line 140. Since current flow is blocked in bit line 142 by turned off EPROM transistor 52, quiescent power dissipation is negligible as in the previous state, where the voltage $V_{IN}$ at node 10 was low.

A high to low transition at input node 10, takes node 32 high, turning EPROM transistor 52 on, and forcing node 72 low. This low voltage is transmitted via n-type buffer transistor 92 to node 60 and the output node 120, turning p-type transistor 40 on. Since node 30 is low, EPROM transistor 50 is off. Thus, as p-type transistor 40 turns on, it brings node 62 high, turning off p-type transistor 42 and blocking current flow in bit line 142. Current flow is blocked in bit line 140 by turned off EPROM transistor 50. The cell has now been returned to its original state.

Figure 2:
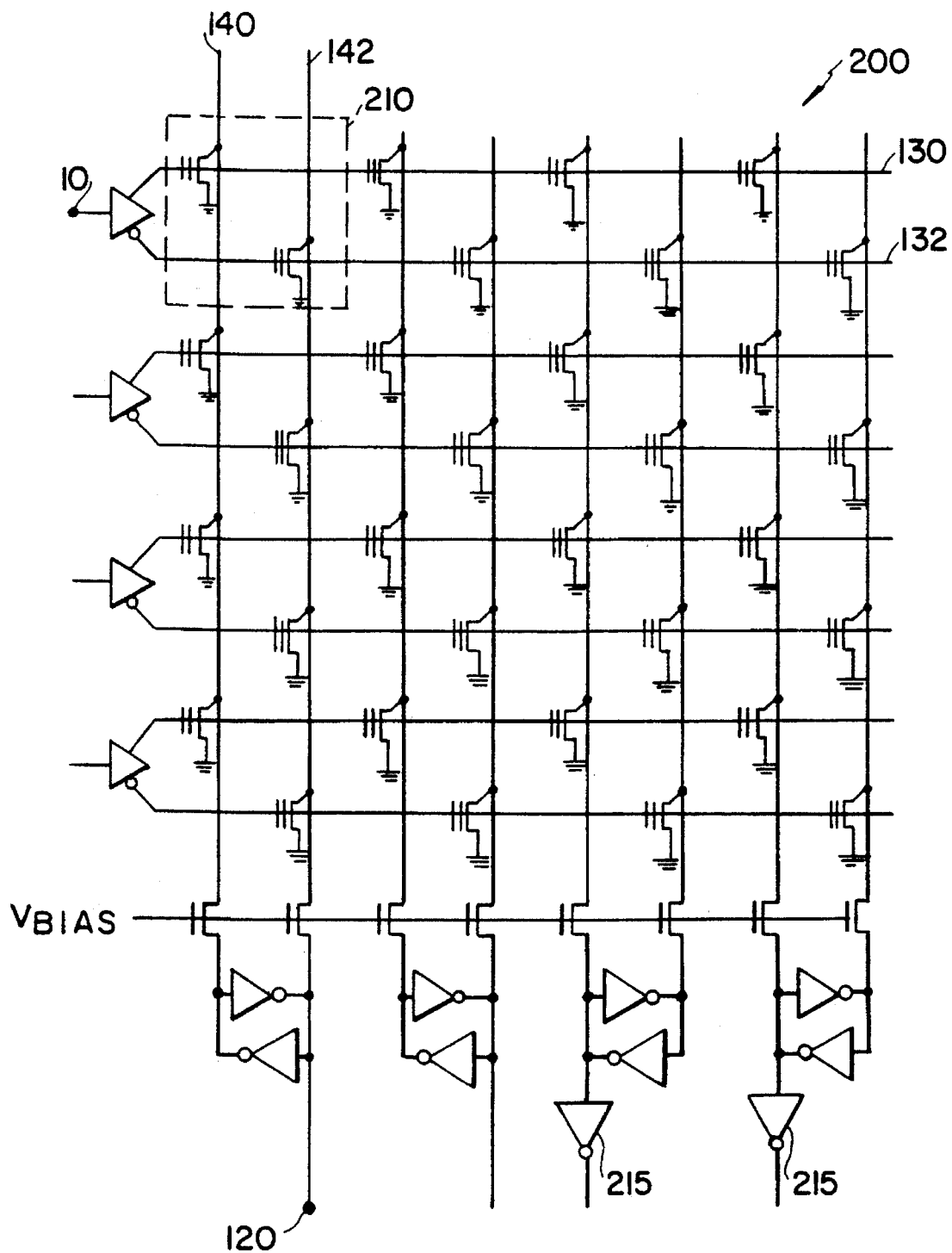
FIG. 2 is a schematic diagram of a representative 4×4 subsection of an illustrative embodiment of a crossbar switch circuit constructed in accordance with the principles of this invention, showing the matrix layout of the cells.

As shown in FIG. 2, the crossbar switch may also include output buffers 215 to buffer and invert the output signal. Further, as shown in FIG. 1, it is also possible to provide output node 122, the complement of node 120.

From the above, it is apparent that not only does the circuit in FIG. 1 transmit input signals at node 10 to output node 120, but that the circuit also provides for zero quiescent power consumption.

As the structure of two-EPROM transistor cell 210 consumes less real estate on the chip, a higher level of integration is possible than if four EPROM transistors were committed to each cell. Two transistor cell 210 also does not load bit lines 140 and 142 and word lines 130 and 132 as much as would a four transistor cell. This reduced loading provides for faster switching in the crossbar circuit.

Although particular attention has been given to the operation of one cell of the crossbar switch circuit, it will be understood that the overall function of the chip is to programmably interconnect N inputs to N outputs, and that among other possible variations within the scope of the invention that will occur to those skilled in the art, any number of inputs and outputs may be used.

We claim:

1. An electrically programmable EPROM-based programmable logic array switch for programmably interconnecting N input nodes to N output nodes comprising:

a plurality of logic means each having a logic input connected to one of said input nodes for receiving a digital signal, each having a first logic output to which said digital signal is provided, and each having a second logic output to which an inverse of said digital signal is provided;

a plurality of pairs of word lines, each pair of word lines being coupled to one of said input nodes through one of said logic means by connecting a first word line in each pair of word lines to said first logic output and connecting a second word line in each pair of word lines to said second logic output, said first and second word lines in each of said pairs of word lines receiving said digital signal and said inverse of said digital signal, respectively;

a plurality of pairs of bit lines, each pair of bit lines having a first bit line and a second bit line on which there are first and second bit line signals, respectively, the second bit line signal being the inverse of the first bit line signal;

a plurality of EPROM transistor pairs, each pair for programmably interconnecting one of said pairs of word lines to one of said pairs of bit lines, each EPROM transistor pair having a first EPROM transistor that has a first EPROM gate connected to said first word line in said one of said pairs of word lines, a first source connected to a supply having a predetermined potential, a first drain connected to said first bit line in said one of said pairs of bit lines, and a first floating gate, each EPROM transistor pair further having a second EPROM transistor that has a second EPROM gate connected to said second word line in said one of said pairs of word lines, a second source connected to said supply, a second drain connected to said second bit line in said one of said pairs of bit lines, and a second floating gate; and circuit means coupled between each of said pairs of bit lines and each of said N output nodes for providing each of said output nodes with output signals that are proportional to said first and second bit line signals, wherein, when a selected pair of EPROM transistors is erased by not applying charge to said first and second floating gates, said first and second transistors in said selected pair of EPROM transistors switch states in response to changes in said digital signal and changes in said inverse of said digital signal, respectively, such that said first and second bit line signals are proportional to said digital signal and said inverse of said digital signal, respectively, and wherein, when pairs of EPROM transistors other than said selected pair are programmed, by applying charge to said first and second floating gates, said first and second transistors in said pairs of EPROM transistors other than said selected pair do not switch states in response to changes in said digital signal and said inverse of said digital signal.

2. The apparatus of claim 1 wherein each of said circuit means comprises a pair of buffer transistors for limiting the excursion of said first and second bit line signals.

3. The apparatus of claim 2 wherein each of said circuit means further comprises output buffers coupled to said buffer transistors and said output nodes for inverting and buffering said output signals.

4. The apparatus of claim 5 wherein each of said circuit means further comprises a pair of cross-coupled inverters coupled to said pair of bit lines via said buffer transistors for limiting quiescent current flow in said pair of bit lines.

5. The apparatus of claim 4 wherein each pair of said cross-coupled inverters comprises:

a first p-type transistor having:
  (1) a first p-type gate connected to said first bit line;
  (2) a first terminal connected to a power supply; and
  (3) a second terminal connected to said second bit line; and a second p-type transistor having:
  (1) a second p-type gate connected to said second bit line;
  (2) a third terminal connected to said power supply; and
  (3) a fourth terminal connected to said first bit line.

6. The apparatus of claim 1 wherein on each of said pairs of word lines, all but one of said pairs of EPROM transistors are programmed by applying charge to all of said first and second floating gates except said first and second gates in said one pair.

7. The apparatus of claim 1 wherein on each of said pairs of bit lines, all but one of said pairs of EPROM transistors are programmed by applying charge to all of said first and second floating gates except said first and second gates in said one pair.

8. The apparatus of claim 1 wherein said predetermined potential is a ground potential.

9. Programmable logic array integrated circuitry for electrically programmably connecting each of a plurality of input terminals to any respective one of a plurality of output terminals comprising:

a plurality of pairs of word line conductors;

a plurality of logic means for coupling said input terminals to said pairs of word line conductors, said input terminals being provided with input signals, wherein each of the logic means applies one of the input signals and a corresponding inverse input signal to respective ones of the word line conductors in an adjacent pair of word line conductors;

a pair of bit line conductors coupled to each of said output terminals;

means for programmably interconnecting each pair of word line conductors to each pair of bit line conductors consisting of a pair of programmable logic elements each having at least a first terminal and a second terminal, the first terminal of each programmable logic element being connected to a respective one of the word lines in one of the pairs of word line conductors, and the second terminal of each programmable logic element being connected to a respective one of the bit lines in that one of the pairs of bit line conductors, wherein the programmable logic elements can be selectively placed in one of two states: (a) a transmitting state, in which changes in the input signal and the inverse input signal produce changes in bit line signals on the bit line conductors, and (b) a blocking state, in which changes in the input signal and the inverse input signal do not produce changes in the bit line signals; and means for coupling the bit line conductors in each pair of bit line conductors to one of the output terminals.

10. The integrated circuitry defined in claim 9 wherein the programmable logic devices are EPROM transistors, the first terminal being a gate terminal the second terminal being connected to a source-drain channel, and wherein the source-drain channel of each EPROM transistor is connected in series between the bit line conductor to which that EPROM transistor is connected and a source of ground potential.

11. The integrated circuitry defined in claim 10 wherein said means for coupling the bit line conductors in each pair of bit line conductors to the output terminals comprises:

a p-channel transistor having a source-drain channel connected in series between each bit line conductor and a source of logical 1 potential, each p-channel transistor also having a gate which is coupled to the other bit line conductor in the associated pair of bit line conductors.

12. The integrated circuitry defined in claim 11 further comprising an n-channel transistor having a source-drain channel connected in series between each bit line conductor and the source-drain channel of the p-channel transistor coupled to that bit line conductor, each n-channel transistor also having a gate connected to a source of bias potential which is intermediate said ground potential and said logical 1 potential.

13. The integrated circuitry defined in claim 12 wherein the output terminal coupled to each pair of bit line conductors is connected between the p-channel and n-channel transistors whose source-drain channels are connected in series with one of the bit line conductors in that pair of bit line conductors.

* * * * *